(12) United States Patent
Li

(10) Patent No.: US 12,268,190 B1
(45) Date of Patent: Apr. 8, 2025

(54) MODULAR PET TOY

(71) Applicant: Yewen Li, Suzhou (CN)

(72) Inventor: Yewen Li, Suzhou (CN)

( * ) Notice: Subject to any disclaimer, the term of this patent is extended or adjusted under 35 U.S.C. 154(b) by 0 days.

(21) Appl. No.: 18/676,594

(22) Filed: May 29, 2024

(51) Int. Cl.
    *A01K 15/02*     (2006.01)

(52) U.S. Cl.
    CPC .................................. *A01K 15/026* (2013.01)

(58) Field of Classification Search
    CPC .... A01K 15/025; A01K 15/026; A01K 15/02; A01K 5/0114
    See application file for complete search history.

(56) References Cited

U.S. PATENT DOCUMENTS

| | | | | |
|---|---|---|---|---|
| 7,278,374 | B2 * | 10/2007 | Mann .................... | A01K 15/026 119/710 |
| 11,503,806 | B1 * | 11/2022 | Mullin ................ | A46B 11/0041 |
| 2012/0012068 | A1 * | 1/2012 | Costello ............... | A01K 15/025 221/282 |
| 2012/0204809 | A1 * | 8/2012 | Axelrod ............... | A01K 15/026 119/709 |
| 2014/0360434 | A1 * | 12/2014 | Yacov ..................... | A01K 7/00 119/51.5 |
| 2017/0020109 | A1 * | 1/2017 | Dewey ..................... | F16B 7/20 |
| 2019/0000040 | A1 * | 1/2019 | McIlvenna .......... | A44B 17/0029 |
| 2019/0098864 | A1 * | 4/2019 | Simon ................... | A01K 15/025 |
| 2019/0141954 | A1 * | 5/2019 | Yuan ..................... | A01K 15/025 119/707 |
| 2019/0261601 | A1 * | 8/2019 | Stone .................... | A01K 15/025 |
| 2020/0113152 | A1 * | 4/2020 | Mcfarlane ............. | A01K 15/026 |
| 2020/0154676 | A1 * | 5/2020 | Walt ...................... | A01K 15/026 |
| 2021/0212290 | A1 * | 7/2021 | Stern ..................... | A01K 15/026 |
| 2023/0263137 | A1 * | 8/2023 | Haarburger .......... | A01K 5/0114 119/710 |
| 2024/0147964 | A1 * | 5/2024 | Tanoury ............... | A01K 5/0114 |

\* cited by examiner

*Primary Examiner* — Trinh T Nguyen
(74) *Attorney, Agent, or Firm* — Hawaii Patent Services; Nathaniel K. Fedde; Kenton N. Fedde

(57) ABSTRACT

A modular pet toy comprises module components, including a lower module part and an upper module part. The upper module part is hollow with a filling area designed for holding pet food. The lower module part extends into the filling area of the upper module part to form a sealing section, which is detachably connected to the filling area. The inner side of the sealing section features a component to assist pets in eating, and the inner wall of the filling area is equipped with several protrusions. This modular design allows for easy assembly and disassembly, providing various functional configurations for enhanced pet interaction and play.

16 Claims, 11 Drawing Sheets

MODULAR PET TOY

TECHNICAL FIELD

The present invention relates to the field of pet toys, specifically to a modular pet toy designed to enhance interaction and play between pets and their owners through various interchangeable functional modules.

BACKGROUND

Pet toys are specially designed to meet the entertainment needs of pets, promoting their physical and mental well-being. Unlike traditional toys, pet toys focus on interaction with pets, helping them expend energy, exercise, stimulate intellectual development, and strengthen emotional bonds with their owners. Pet toys can be categorized into two main types based on their functionality: solitary toys and interactive toys. Solitary toys are suitable for pets to play with on their own when the owner is unavailable, while interactive toys require the owner's participation, enhancing the bond between them.

Existing patents, such as U.S. Pat. No. 6,237,538B1, disclose a "Pet toy ball feeder" that extends the interaction time and frequency between pets and pet toys by allowing food to be placed inside the toy. Although this patent allows for the disassembly of the pet toy, its structure and functionality remain singular and do not support the replacement of different functional toy modules as needed.

Therefore, there is a need to propose a new type of pet toy that allows food to be placed inside during use, increasing the interaction time and frequency between pets and the toy. Additionally, this pet toy should be designed in a modular way, allowing for easy assembly and disassembly, thereby enabling the replacement of different functional modules. This modular approach provides various functional configurations to cater to different pet needs and preferences, enhancing the overall interaction and engagement between pets and their owners.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The present invention provides a modular pet toy to solve the problem of existing pet toys having a singular structure and function and being unable to replace different functional toy modules as needed.

To achieve the above objective, the present invention adopts the following technical solution:

A modular pet toy, comprising a modular component; wherein the modular component comprises a lower module and an upper module, the upper module being hollow inside and set as a filling area for filling food; and the lower module is located on one side of the upper module, the lower module extending toward the upper module side into the filling area and forming a sealing part, the sealing part being detachably connected to the filling area; and the inner side of the sealing part is provided with a mating part for mating with a pet during feeding.

A pet toy assembly method, comprising using a modular pet toy, the toy comprising a modular component, the modular component comprising a lower module and an upper module, the upper module being hollow inside and set as a filling area for filling food, the lower module extending toward the upper module side into the filling area and forming a sealing part, a blocking piece being installed on the inner surface of the sealing part, the outer surface of the sealing part having an external thread, and the inner surface of the filling area having an internal thread; and the method comprising the following steps:

Step 1, separating the lower module and the upper module;

Step 2, selecting the desired lower module or upper module; and

Step 3, assembling the selected lower module or upper module.

BRIEF DESCRIPTION OF THE DRAWINGS

In order to explain the technical scheme of this application more clearly, the drawings needed in the implementation will be briefly introduced below. Obviously, the drawings described below are only some implementations of this application. For those skilled in the art, other drawings can be obtained according to these drawings without creative work.

Figure 1:
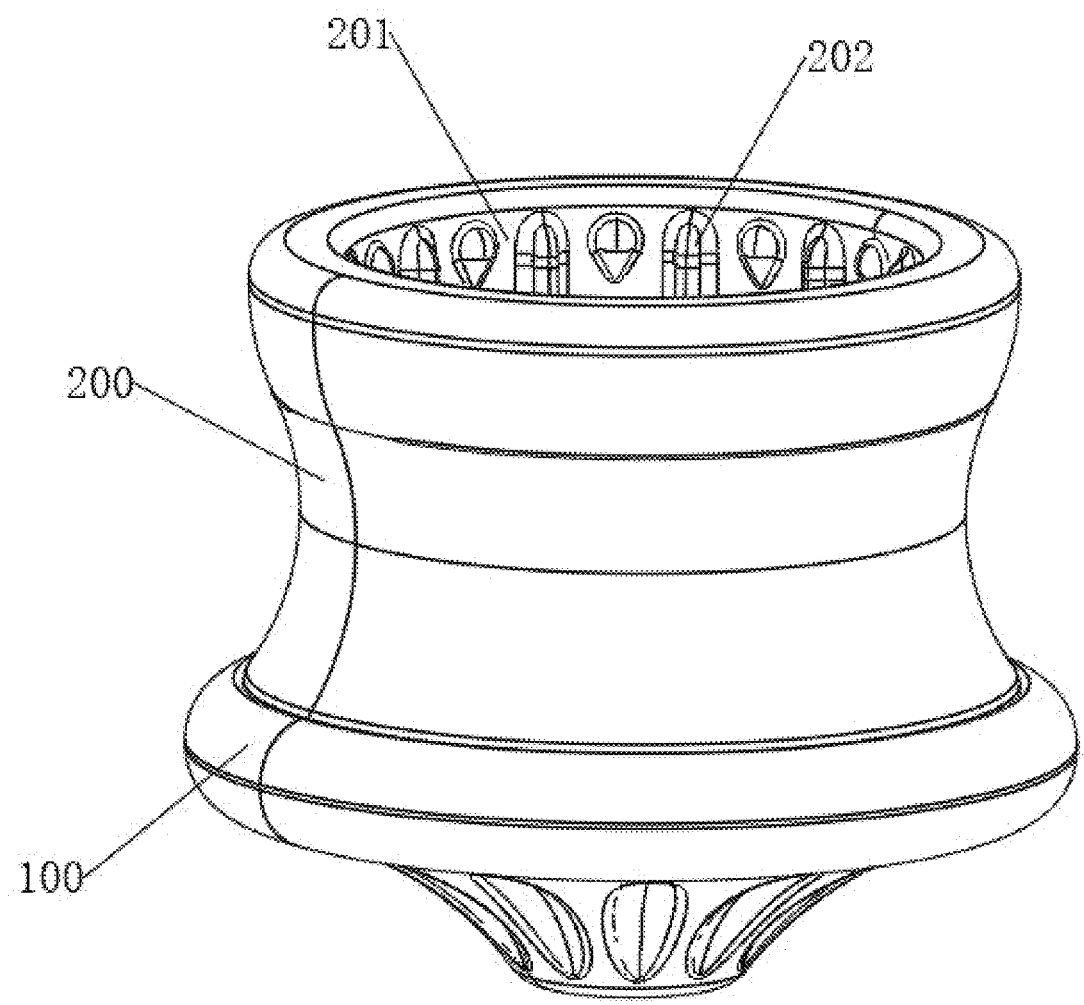
FIG. 1 shows a schematic structural view of the present invention when assembled.
Figure 2:
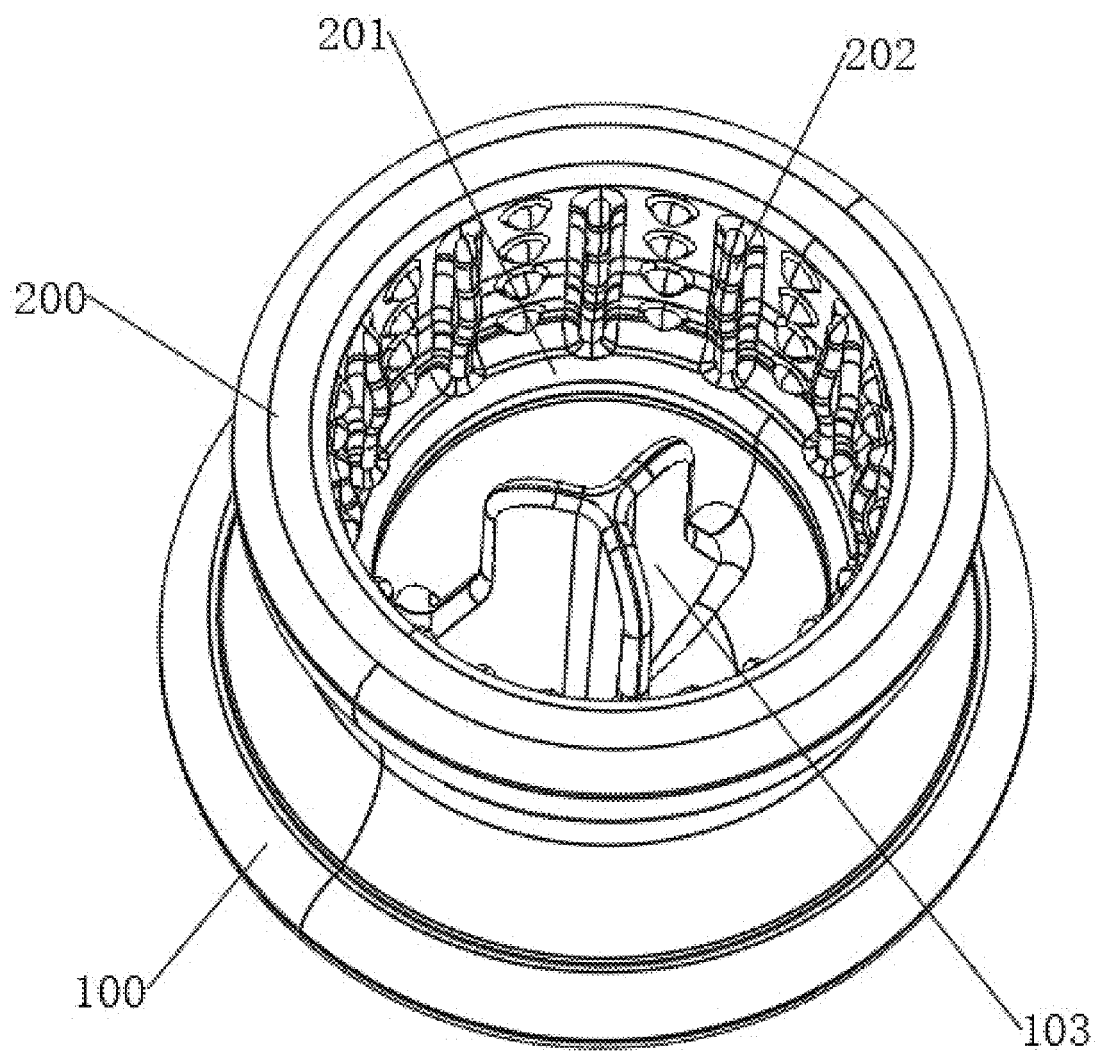
FIG. 2 shows a schematic structural view from another angle of FIG. 1.

In the drawings: 100 is the lower module; 101 is the sealing part; 102 is the external thread; 103 is the blocking piece; 104 is the connecting piece; 105 is the long tubular groove; 200 is the upper module; 201 is the filling area; 202 is the protruding part; 203 is the internal thread; 204 is the licking opening; 205 is the food retaining sheet.

DESCRIPTION OF EMBODIMENTS

In describing the preferred embodiments, specific terminology will be resorted to for the sake of clarity. It is to be understood that each specific term includes all technical equivalents which operate in a similar manner to accomplish a similar purpose.

While various aspects and features of certain embodiments have been summarized above, the following detailed description illustrates a few exemplary embodiments in further detail to enable one skilled in the art to practice such embodiments. Reference will now be made in detail to embodiments of the inventive concept, examples of which are illustrated in the accompanying drawings. The accompanying drawings are not necessarily drawn to scale. The described examples are provided for illustrative purposes and are not intended to limit the scope of the invention. It should be understood, however, that persons having ordinary skill in the art may practice the inventive concept without these specific details.

It will be understood that, although the terms first, second, etc. may be used herein to describe various elements, these elements should not be limited by these terms. These terms are only used to distinguish one element from another. For example, a first attachment could be termed a second attachment, and, similarly, a second attachment could be termed a first attachment, without departing from the scope of the inventive concept.

It will be understood that when an element or layer is referred to as being "on," "coupled to," or "connected to" another element or layer, it can be directly on, directly coupled to or directly connected to the other element or layer, or intervening elements or layers may be present. In contrast, when an element is referred to as being "directly on," "directly coupled to," or "directly connected to" another element or layer, there are no intervening elements or layers present. Like numbers refer to like elements throughout. As used herein, the term "and/or" includes any and all combinations of one or more of the associated listed items.

As used in the description of the inventive concept and the appended claims, the singular forms "a," "an," and "the" are intended to include the plural forms as well, unless the context clearly indicates other.

Embodiment 1

Please refer to FIGS. 1 to 4.

The present invention provides a modular pet toy comprising a modular component, the modular component including a lower module 100 and an upper module 200. The upper module 200 is hollow inside and set as a filling area 201 for filling food. The lower module 100 is located on one side of the upper module 200. The lower module 100 extends toward the upper module 200 side into the filling area 201 and forms a sealing part 101. The sealing part 101 is detachably connected to the filling area 201. The inner side of the sealing part 101 is provided with a mating part for mating with a pet during feeding. The outer surface of the sealing part 101 has an external thread 102. The inner surface of the filling area 201 has an internal thread 203, and the internal thread 203 is threaded with the external thread 102.

The filling area 201 can be filled with food for pet consumption. The bottom of the lower module 100 has a truncated cone shape, so that when the pet toy is placed on the ground or a platform, the pet toy is in an inclined state and not easily toppled.

In this embodiment, the internal thread 203 and the external thread 102 cooperate to allow the lower module 100 and the upper module 200 to be disassembled, so that the lower module 100 and the upper module 200 can be replaced or conveniently disassembled for cleaning.

In other embodiments (not shown in the figures), the sealing part 101 and the filling area 201 can be connected by a snap-fit or an interference fit, so that this method can also allow the upper module 200 and the lower module 100 to be detachably connected. Moreover, the detachable connection method between the upper module 200 and the lower module 100 is not limited to the above-mentioned connection methods but can also use other methods that can achieve detachable assembly.

The inner wall of the filling area 201 is provided with a plurality of protruding parts 202. The protruding parts 202 are semi-spherical and strip-shaped, and the strip-shaped protruding parts 202 and the semi-spherical protruding parts 202 are alternately distributed. The mating part is a blocking piece 103, and the blocking piece 103 is installed on the inner surface of the sealing part 101.

In this embodiment, the top of the filling area 201 is an open mouth. The filling area 201 is filled with pet food, and the sealing part 101 seals the bottom of the filling area 201. At the same time, some food will also enter the sealing part 101, so that the sealing part 101 can also store some food.

Therefore, when the pet uses the pet toy, it can lick the food in the filling area 201 and the sealing part 101 with its tongue.

By providing protruding parts 202 on the inner wall of the filling area 201, when the pet licks the food, the protruding parts 202 can rub against the pet's tongue, thereby cleaning the pet's tongue. Additionally, the protruding parts 202 can stimulate and massage the pet's tongue, increasing the pet's appetite. Furthermore, the protruding parts 202 can also make the food adhere better to the inner wall of the filling area 201, prolonging the pet's feeding and playing time, and increasing the contact time between the pet's tongue and the protruding parts 202, enhancing the cleaning and stimulation effects on the tongue.

The protruding parts 202 are not limited to semi-spherical and strip shapes. In other embodiments (not shown in the figures), the protruding parts 202 can also be conical, polyhedral, or any other three-dimensional shape suitable for stimulating the pet's tongue.

By providing the blocking piece 103 in the filling area 201, when the pet licks the food, the blocking piece 103 can further act as an obstacle to the food or the pet's tongue, further prolonging the pet's feeding time.

Figure 3:
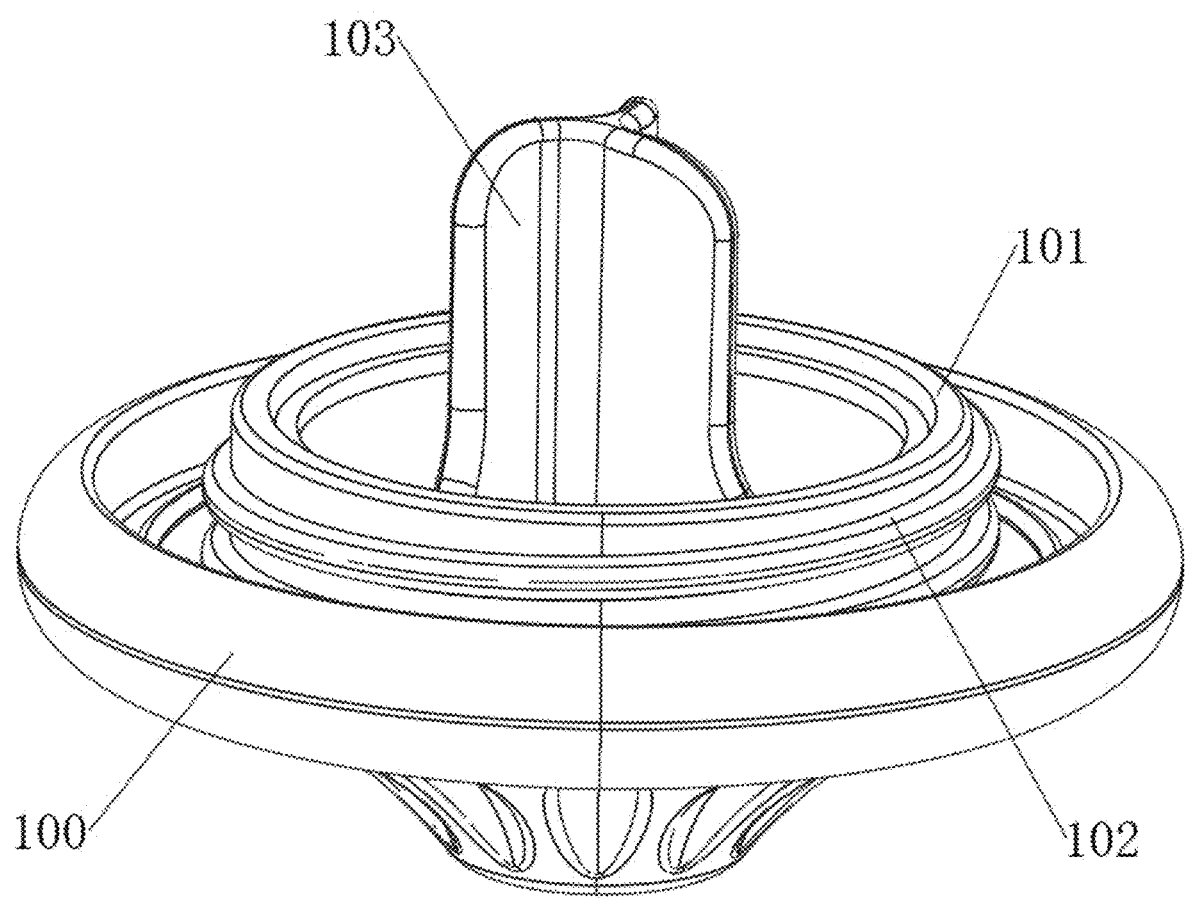
FIG. 3 shows a schematic structural view of the lower module in embodiment 1 of the present invention.
Figure 4:
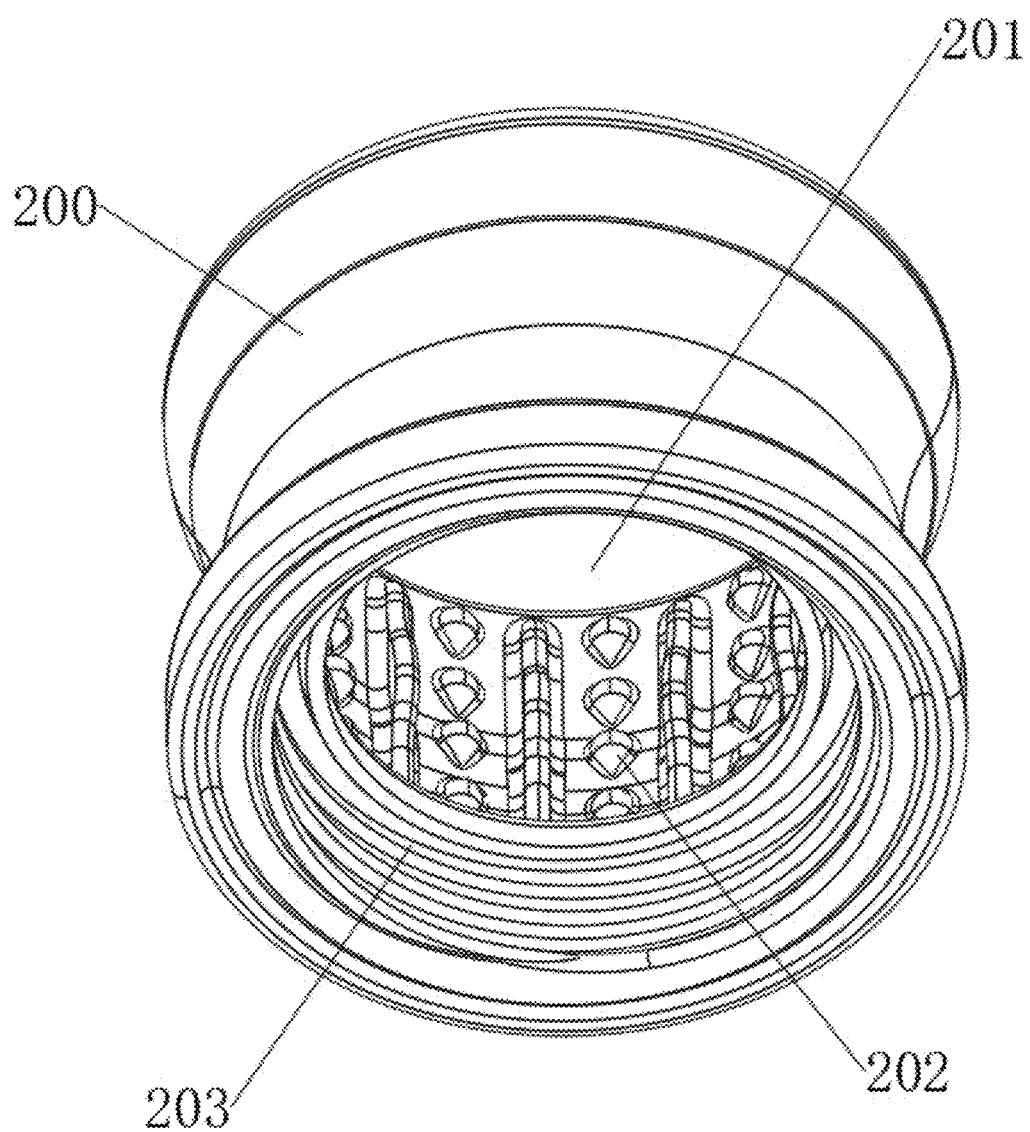
FIG. 4 shows a schematic structural view of the upper module in embodiment 1 of the present invention.

The size and shape of the blocking piece 103 are not limited to the shape shown in FIG. 3 but can also be spherical, conical, polyhedral, or other three-dimensional geometric shapes.

The blocking piece 103 can also be installed in the sealing part 101 in a detachable manner, such as by using a threaded connection, snap-fit, or other detachable installation methods. In this way, through the detachable installation method, the blocking piece 103 can also be individually detached and replaced, improving the applicability of the pet toy.

Embodiment 2

Figure 5:
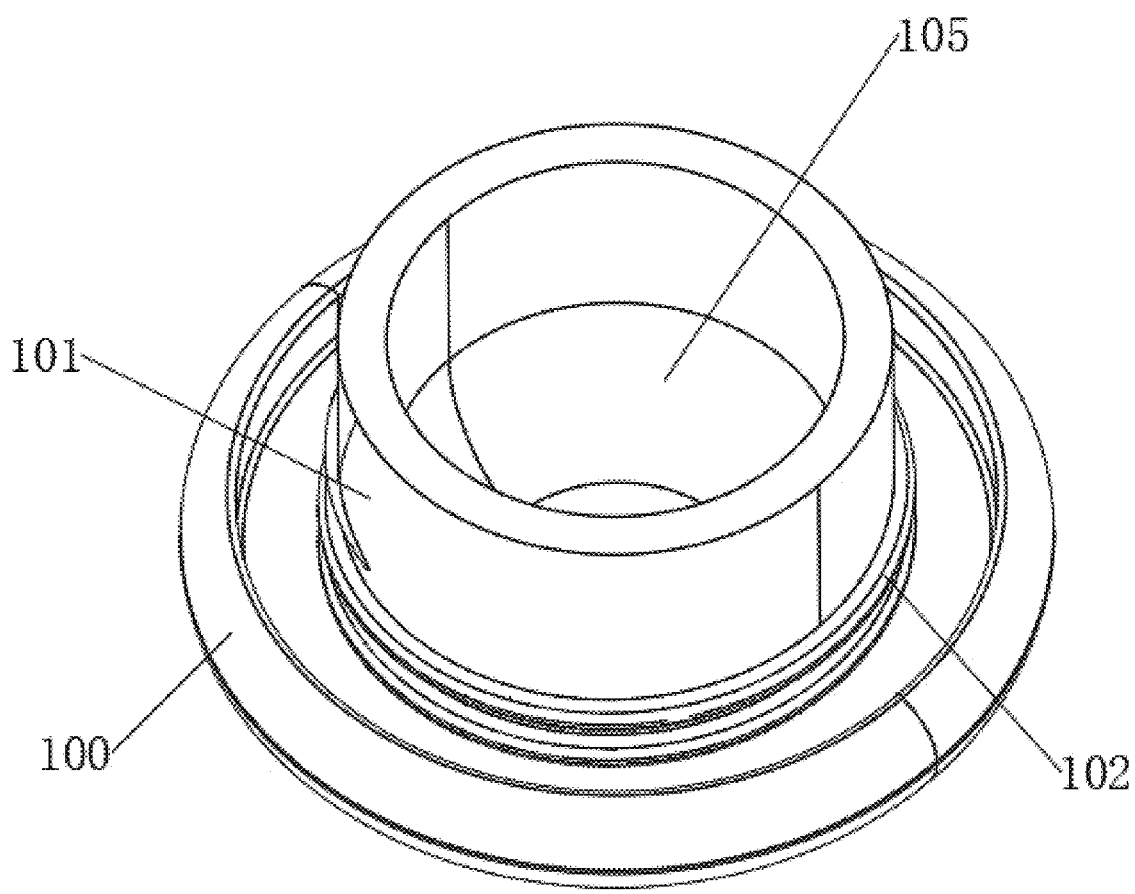
FIG. 5 shows a schematic structural view of the lower module in embodiment 2 of the present invention.
Figure 6:
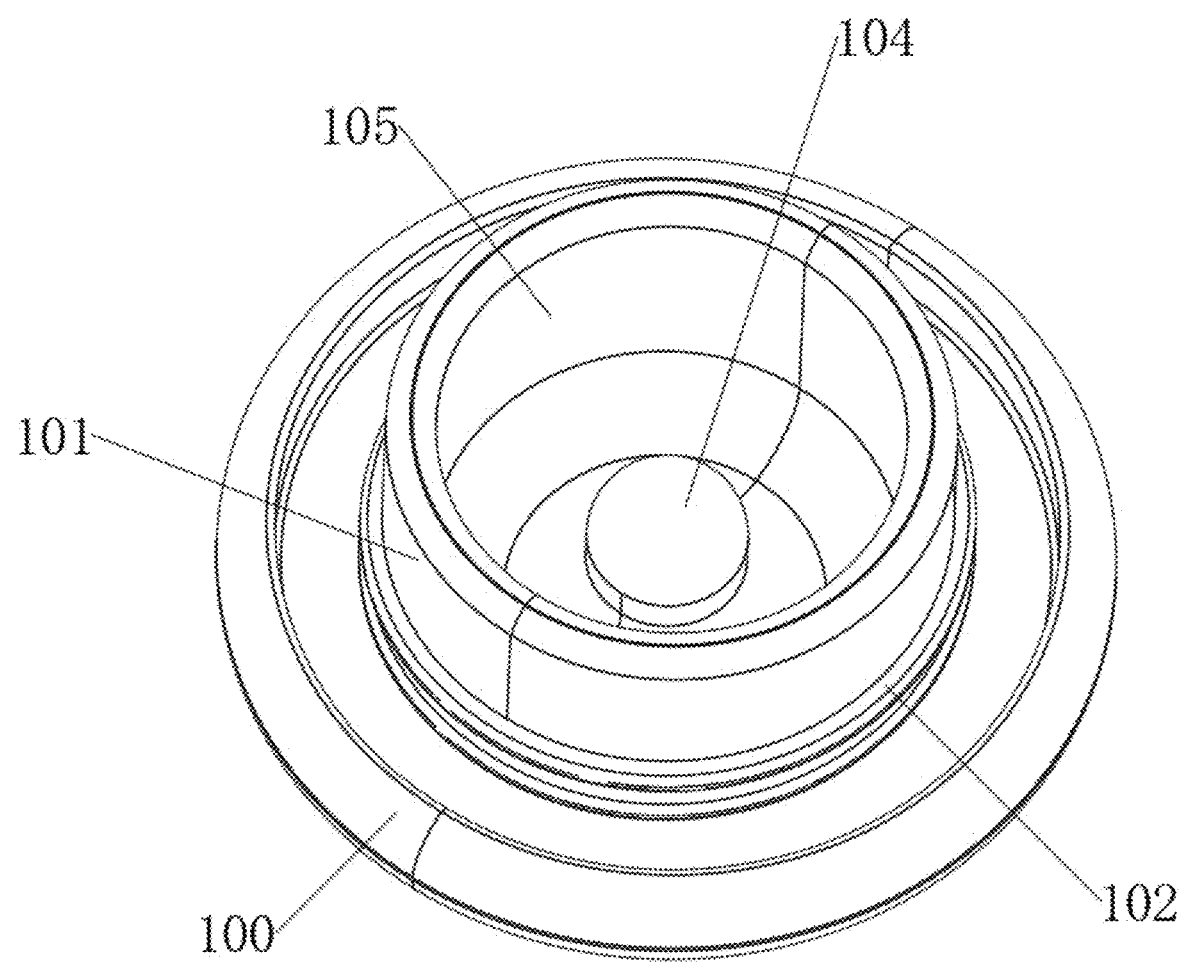
FIG. 6 shows a schematic structural view of another embodiment of FIG. 5.
Figure 8:
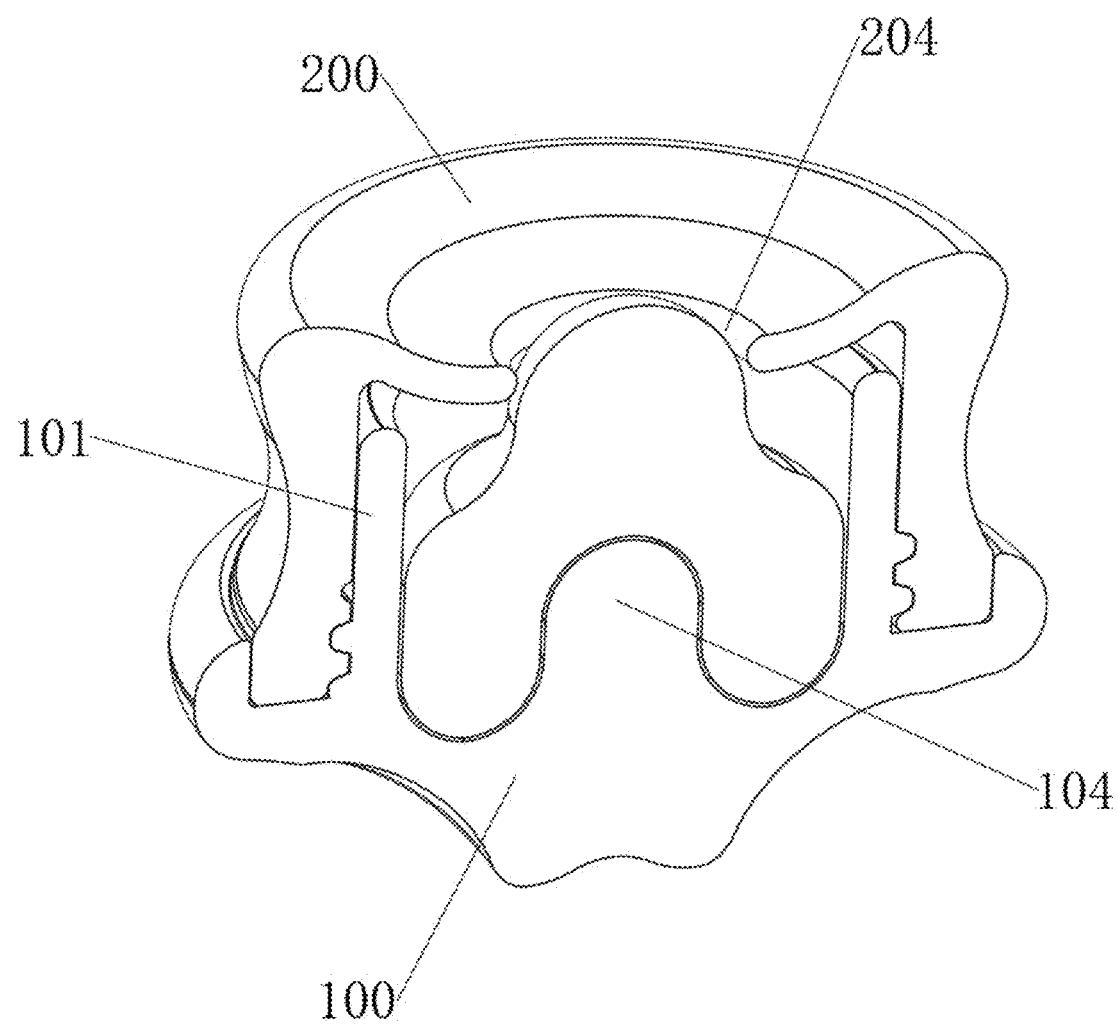
FIG. 8 shows a sectional view of the lower module in embodiment 2 assembled with the upper module in embodiment 2 of the present invention.

Please refer to FIGS. 5 and 8.

The difference between embodiment 2 and embodiment 1 is that the mating part is a long tubular groove 105. The sealing part 101 extends toward the opposite side of the filling area 201 and forms a tubular structure. The long tubular groove 105 is provided in the tubular sealing part 101. The filling area 201 has a licking opening 204 at the end away from the sealing part 101, and the diameter of the licking opening 204 is smaller than that of the filling area 201.

By providing the long tubular groove 105, the amount of food that can be filled in the sealing part 101 can be increased. At the same time, the inner surface of the long tubular groove 105 is a relatively smooth surface, making it difficult for the food to adhere to the inner wall of the long tubular groove 105. This can reduce the difficulty for the pet to lick the food and adjust the pet's licking time. By providing the licking opening 204, the opening area at the top of the filling area 201 can be reduced, thereby increasing the difficulty for the pet to lick the food and prolonging the pet's licking time and playing time.

In this embodiment, the upper module 200 and the lower module 100 can be interchanged and assembled with the upper module 200 and the lower module 100 of embodiment 1, and the assembled pet toy can have added functionality.

For example, combining the upper module 200 of embodiment 2 with the lower module 100 of embodiment 1 can further increase the difficulty for the pet to lick the food.

For example, combining the lower module 100 of embodiment 2 with the upper module 200 of embodiment 1 results in most of the food being placed in the long tubular groove 105 after the pet toy is filled with food, and without the blocking piece 103 as an obstacle, the pet can lick the food more easily with less difficulty.

Figure 7:
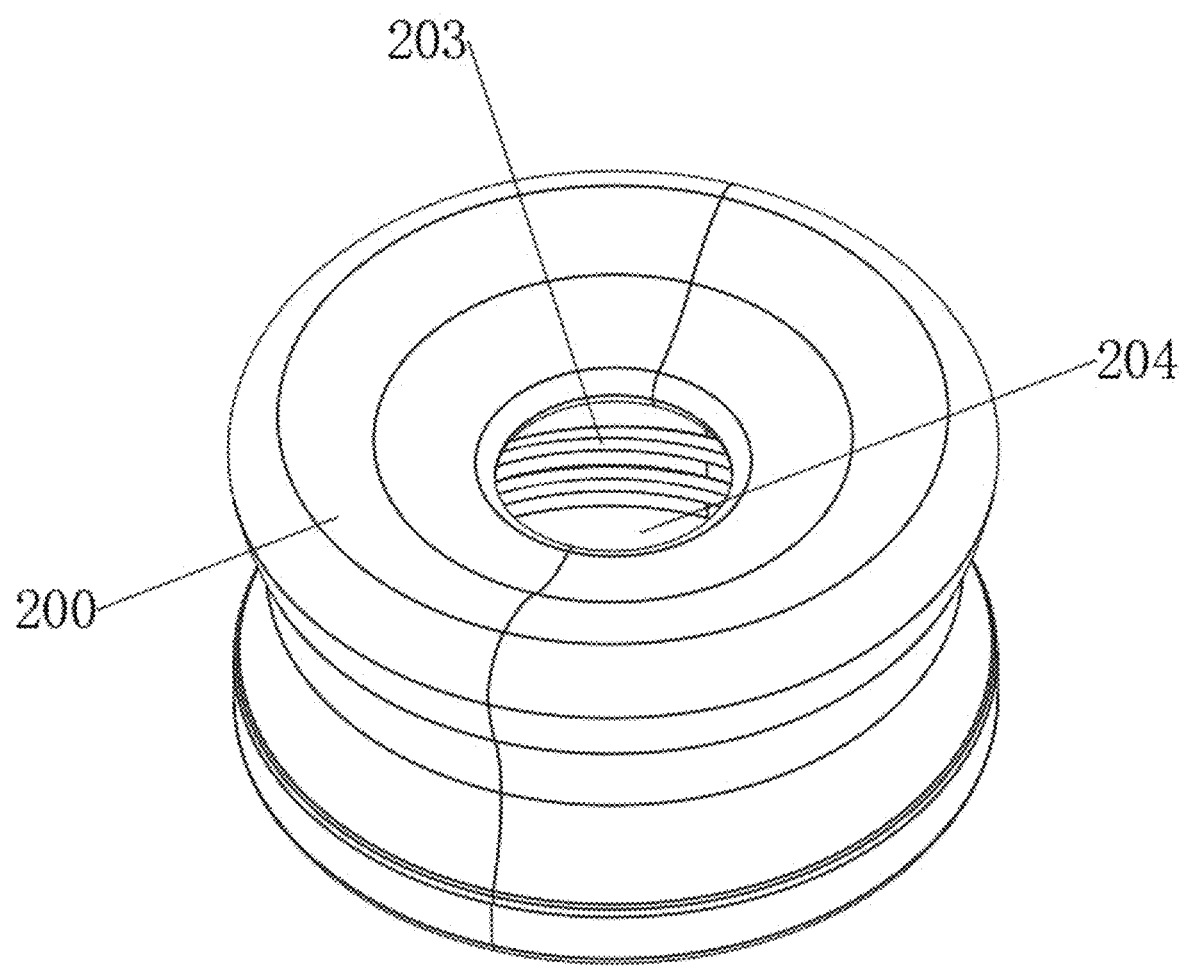
FIG. 7 shows a schematic structural view of the upper module in embodiment 2 of the present invention.

In other embodiments, as shown in FIG. 7, the bottom of the long tubular groove 105 is provided with a connecting piece 104. The connecting piece 104 has a spherical structure. A large chunk of food with a specific shape can form a snap-fit with the connecting piece 104, as shown in FIG. 8.

When the lower module 100 with the connecting piece 104 is combined with the upper module 200 of embodiment 2, as shown in FIG. 8, the pet can gradually lick the food connected to the connecting piece 104 through the licking opening 204. Since the food connected to the connecting piece 104 is a large chunk, the food is less likely to fall out of the pet toy, thereby prolonging the time for the pet to lick the food and better stimulating the pet's interest and extending the playing time.

The connecting piece 104 is not limited to the shape shown in the figures but can be any shape suitable for mating with the food. Furthermore, when the long tubular groove 105 is filled with some scattered food, the connecting piece 104 can also act as an obstacle to the pet licking the food, prolonging the pet's licking time.

Embodiment 3

Figure 9:
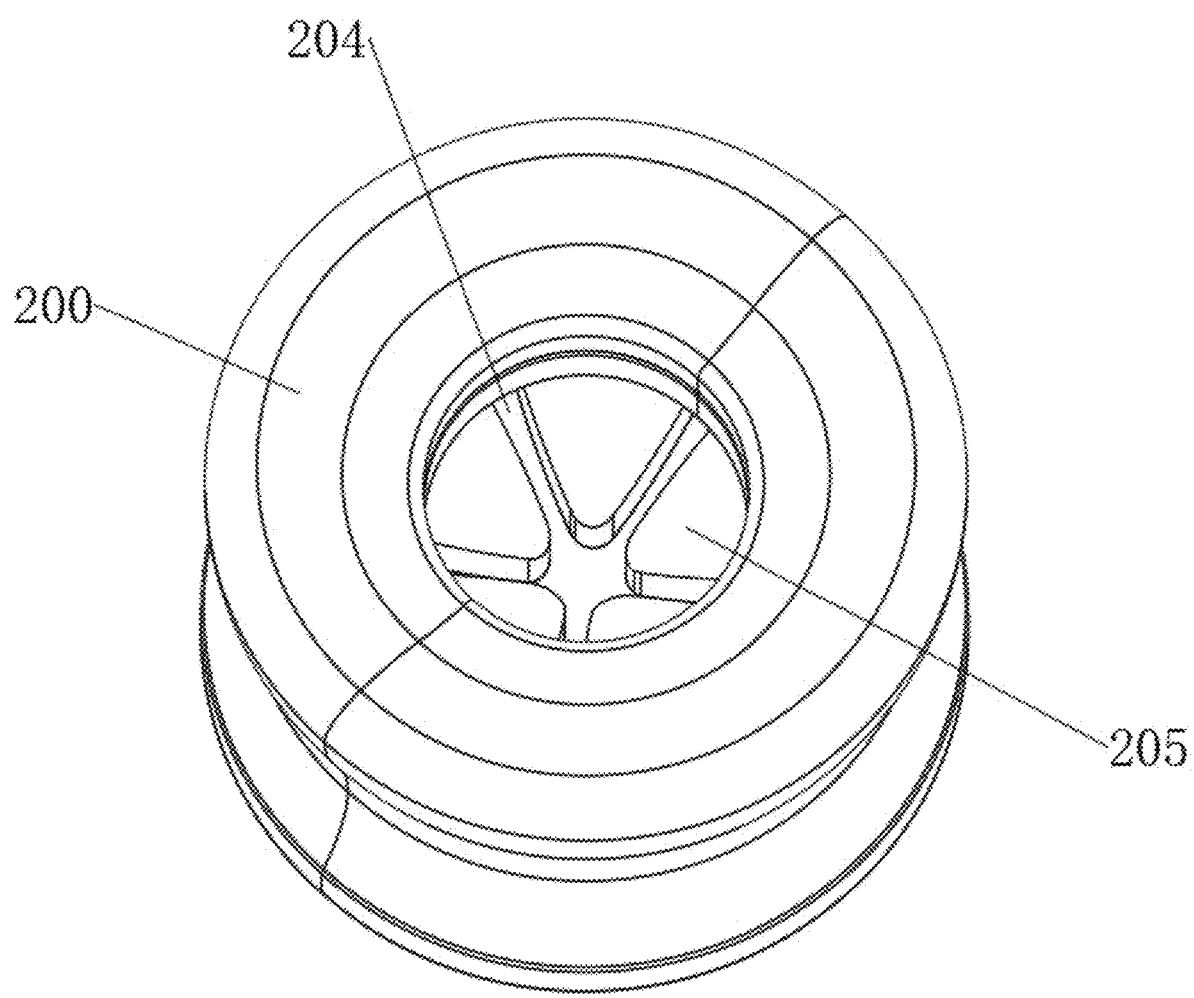
FIG. 9 shows a schematic structural view of the upper module in embodiment 3 of the present invention.
Figure 10:
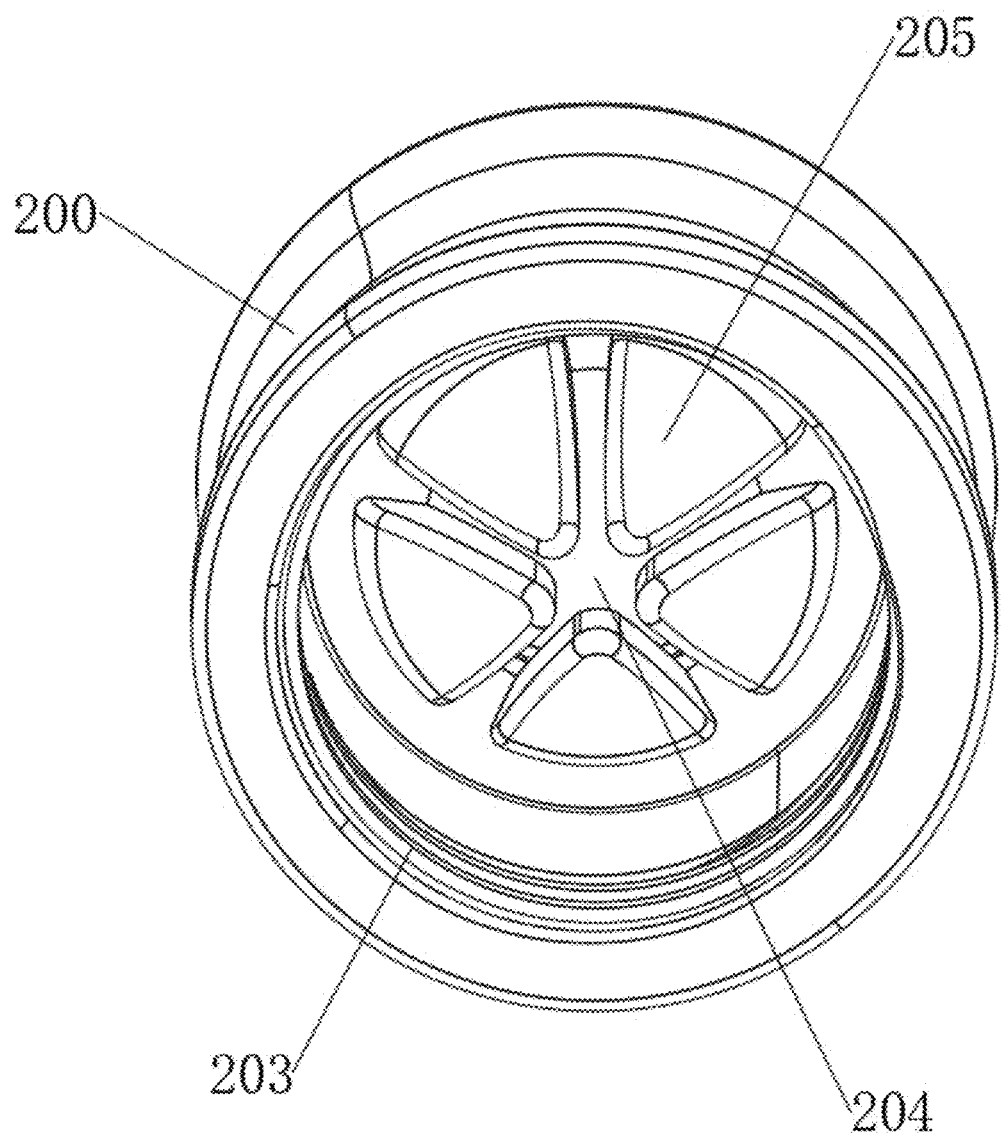
FIG. 10 shows a schematic structural view from another angle of FIG. 9.
Figure 11:
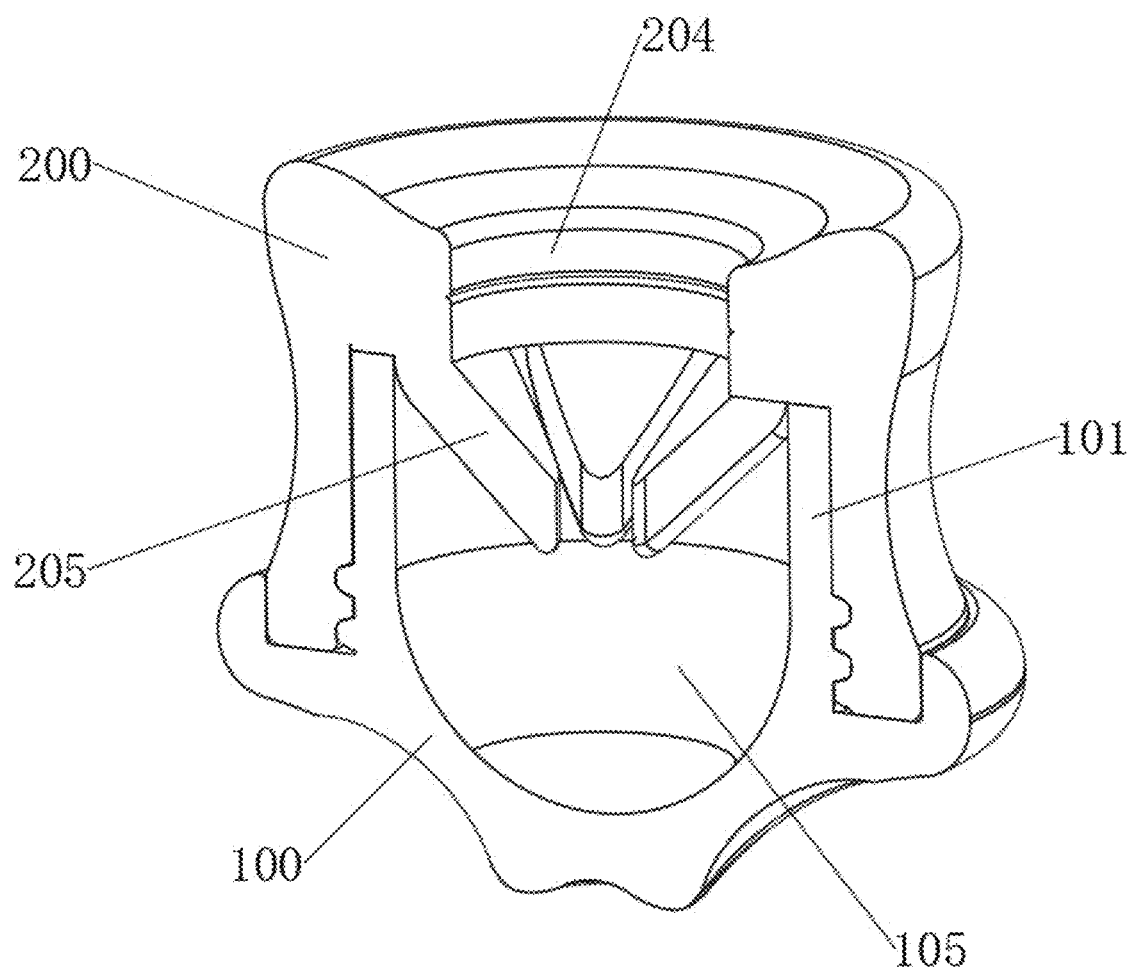
FIG. 11 shows a sectional view of the upper module in embodiment 3 assembled with the lower module in embodiment 2 of the present invention.

Please refer to FIGS. 9 to 11.

The difference between embodiment 3 and embodiment 2 is that at least one food retaining sheet 205 is installed at the licking opening 204. The food retaining sheet 205 is made of an elastic material, and the food retaining sheet 205 is triangular in shape. The lower module 100 and the upper module 200 are made of TPE material or nylon material, but not limited to these materials.

In this embodiment, the food retaining sheet 205 is inclined toward the filling area 201, that is, the food retaining sheet 205 is concavely set on the upper module 200. By providing the food retaining sheet 205 at the licking opening 204, the food retaining sheet 205 can prevent the food in the filling area 201 from easily falling out. At the same time, the food retaining sheet 205 can prevent the pet from extending its tongue into the filling area 201 to lick the food, so that the pet can only eat the food that falls out during play, increasing the fun and playing time of the pet toy.

The food retaining sheet 205 is made of an elastic material, such as TPE material, natural rubber, or other materials, giving the food retaining sheet 205 elasticity.

In other embodiments (not shown in the figures), the food retaining sheet 205 can also have other geometric shapes, and the food retaining sheet 205 can also be oriented away from the filling area 201.

In this embodiment, the upper module 200 and the lower module 100 can be interchanged and assembled with the upper module 200 and the lower module 100 of embodiment 1 and embodiment 2, and the assembled pet toy can further increase its functionality.

For example, by combining the upper module 200 of this embodiment with the lower module 100 of embodiment 2, as shown in FIG. 11, this combination allows rod-shaped foods such as dental chews to be inserted into the long tubular groove 105 from the licking opening 204, with the other end extending out from the licking opening 204 for the pet to chew on. When the food passes through the licking opening 204, the elastic food retaining sheet 205 can hold the food in place and prevent it from falling out easily. In this way, the pet toy also serves the function of holding rod-shaped foods.

In summary:

By providing the detachable lower module 100 and upper module 200, the pet toy can be assembled and replaced in a modular manner, allowing the pet toy to achieve different functions after assembly and replacement. At the same time, the detachable structure also facilitates cleaning of the pet toy.

Moreover, the lower module 100 and the upper module 200 are not limited to the shapes shown in the above embodiments but can be any other shape suitable for pet play, thereby giving the pet toy more functions.

Furthermore, the mating part is not limited to the shapes shown in the above embodiments but can be any other shape suitable for assisting the pet in feeding.

The present invention also provides a pet toy assembly method, comprising using a modular pet toy, the toy comprising a modular component, the modular component comprising a lower module 100 and an upper module 200, the upper module 200 being hollow inside and set as a filling area 201 for filling food, the lower module 100 extending toward the upper module 200 side into the filling area 201 and forming a sealing part 101, a blocking piece 103 being installed on the inner surface of the sealing part 101, the outer surface of the sealing part 101 having an external thread 102, and the inner surface of the filling area 201 having an internal thread 203. The method comprises the following steps:

Step 1, separating the lower module 100 and the upper module 200; when separating the lower module 100 and the upper module 200, rotating the lower module 100 or the upper module 200 to disengage the internal thread 203 and the external thread 102.

Step 2, selecting the desired lower module 100 or upper module 200.

Step 3, assembling the selected lower module 100 or upper module 200.

The technical means disclosed in the scheme of the present invention are not limited to the technical means disclosed in the above embodiments, but also include the technical scheme composed of any combination of the above technical features. It should be pointed out that for those skilled in the art, several improvements and embellishments can be made without departing from the principle of the present invention, and these improvements and embellishments are also regarded as the protection scope of the present invention.

The invention has now been described in detail for the purposes of clarity and understanding. However, those skilled in the art will appreciate that certain changes and modifications may be practiced within the scope of the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A modular pet toy, comprising a modular component, wherein:
    the modular component comprises a lower module and an upper module, the upper module being hollow inside and set as a filling area for filling food;
    the lower module is located on one side of the upper module, the lower module extending toward the upper module side into the filling area and forming a sealing part, the sealing part being detachably connected to the filling area;
    the inner side of the sealing part is provided with a mating part for being interacted with by a pet's tongue during feeding; and
    the lower module has a bottom, wherein the bottom has a truncated cone shape such that when the pet toy is placed on a ground or a platform, the pet toy is in an inclined state.

2. The modular pet toy according to claim 1, wherein the inner wall of the filling area is provided with a plurality of protruding parts.

3. The modular pet toy according to claim 2, wherein the protruding parts are semi-spherical and strip-shaped, and the strip-shaped protruding parts and the semi-spherical protruding parts are alternately distributed.

4. The modular pet toy according to claim 1, wherein the outer surface of the sealing part has an external thread.

5. The modular pet toy according to claim 4, wherein the inner surface of the filling area has an internal thread, and the internal thread is threaded with the external thread.

6. The modular pet toy according to claim 1, wherein the mating part is a blocking piece, and the blocking piece is installed on the inner surface of the sealing part.

7. The modular pet toy according to claim 1, wherein the mating part is a long tubular groove, the sealing part extends toward the opposite side of the filling area and forms a tubular structure, and the long tubular groove is provided in the tubular sealing part.

8. The modular pet toy according to claim 7, wherein the bottom of the long tubular groove is provided with a connecting piece.

9. The modular pet toy according to claim 1, wherein the filling area has a licking opening at the end away from the sealing part, and the diameter of the licking opening is smaller than that of the filling area.

10. The modular pet toy according to claim 9, wherein at least one food retaining sheet is installed at the licking opening.

11. The modular pet toy according to claim 10, wherein the food retaining sheet is made of an elastic material, and the food retaining sheet is triangular in shape.

12. The modular pet toy according to claim 1, wherein the lower module and the upper module are made of TPE material or nylon material.

13. The modular pet toy according to claim 1, wherein the top of the filling area is an open mouth.

14. The modular pet toy according to claim 13, wherein both the filling area and the sealing part can be filled with food.

15. The module pet toy according to claim 14, wherein the filling area and the sealing part are configured such that a pet can lick the food in the filling area and the sealing part with its tongue.

16. The modular pet toy according to claim 6, wherein the top of the filling area is an open mouth and wherein the blocking piece extends towards the open mouth.

\* \* \* \* \*